United States Patent [19]

Wheeler et al.

[11] Patent Number: 4,930,852
[45] Date of Patent: Jun. 5, 1990

[54] OPTICAL FIBER MOUNTING AND STRUCTURAL MONITORING

[75] Inventors: Richard G. Wheeler, Robbinsville, N.J.; Roy Robinson, Hook Bathingstoke, England

[73] Assignee: Simmonds Precision Product, Inc., Wilmington, Del.

[21] Appl. No.: 313,262

[22] Filed: Feb. 21, 1989

[51] Int. Cl.⁵ .................. G02B 6/00; G01L 1/24
[52] U.S. Cl. ................ 350/96.10; 250/227.11; 350/96.23
[58] Field of Search ........... 350/96.10, 96.23, 96.24, 350/96.29; 250/227, 231 P, 231 R, 577, 578; 73/800, 802

[56] References Cited

U.S. PATENT DOCUMENTS

| | | | |
|---|---|---|---|
| 2,523,865 | 9/1950 | Dildilian | 154/43 |
| 2,787,570 | 4/1957 | Lott et al. | 154/52 |
| 3,321,658 | 5/1967 | Pratt | 350/96.24 X |
| 3,599,679 | 8/1971 | Carter | 350/96.24 X |
| 4,070,333 | 1/1978 | Jabloner | 260/42.18 |
| 4,097,460 | 6/1978 | Jabloner | 260/47 UA |
| 4,138,193 | 2/1979 | Olszewski et al. | 350/96.23 |
| 4,144,218 | 3/1979 | French | 260/32.6 R |
| 4,239,335 | 12/1980 | Stiles | 350/96.23 |
| 4,307,386 | 12/1981 | Bridge | 350/96.23 |
| 4,355,865 | 10/1982 | Conrad et al. | 350/96.23 |
| 4,381,882 | 5/1983 | Sabine | 350/96.16 X |
| 4,422,719 | 12/1983 | Orcutt | 350/96.10 X |
| 4,519,869 | 5/1985 | Gill et al. | 156/428 |
| 4,537,469 | 8/1985 | Kircher | 350/96.24 |
| 4,581,086 | 4/1986 | Gill et al. | 156/175 |
| 4,603,252 | 7/1986 | Malek et al. | 73/800 X |
| 4,630,887 | 12/1986 | Taylor | 350/96.23 |
| 4,654,520 | 3/1987 | Griffiths | 250/227 |
| 4,656,208 | 4/1987 | Chu et al. | 523/400 |
| 4,677,305 | 6/1987 | Ellinger | 250/577 |
| 4,680,076 | 7/1987 | Bard | 156/306.9 |
| 4,752,114 | 6/1988 | French | 350/96.10 X |
| 4,772,092 | 9/1988 | Hofer et al. | 350/96.29 X |
| 4,812,645 | 3/1989 | Griffiths | 73/800 X |

Primary Examiner—Frank Gonzalez
Assistant Examiner—Akm E. Ullah
Attorney, Agent, or Firm—Dale R. Lovercheck

[57] ABSTRACT

An optical fiber mounting device and method of installation and monitoring of a structure using the device. The device includes an optical fiber connected to a support sheet. The support sheet is readily adapted to be connected to a structure. The method of installation of the device includes affixing the support sheet to a structure. The fabricated structure is monitored by propagating light through the installed optical fiber and continuously monitoring the light to detect changes in temperature, pressure, stress and/or strain in the structure.

21 Claims, 3 Drawing Sheets

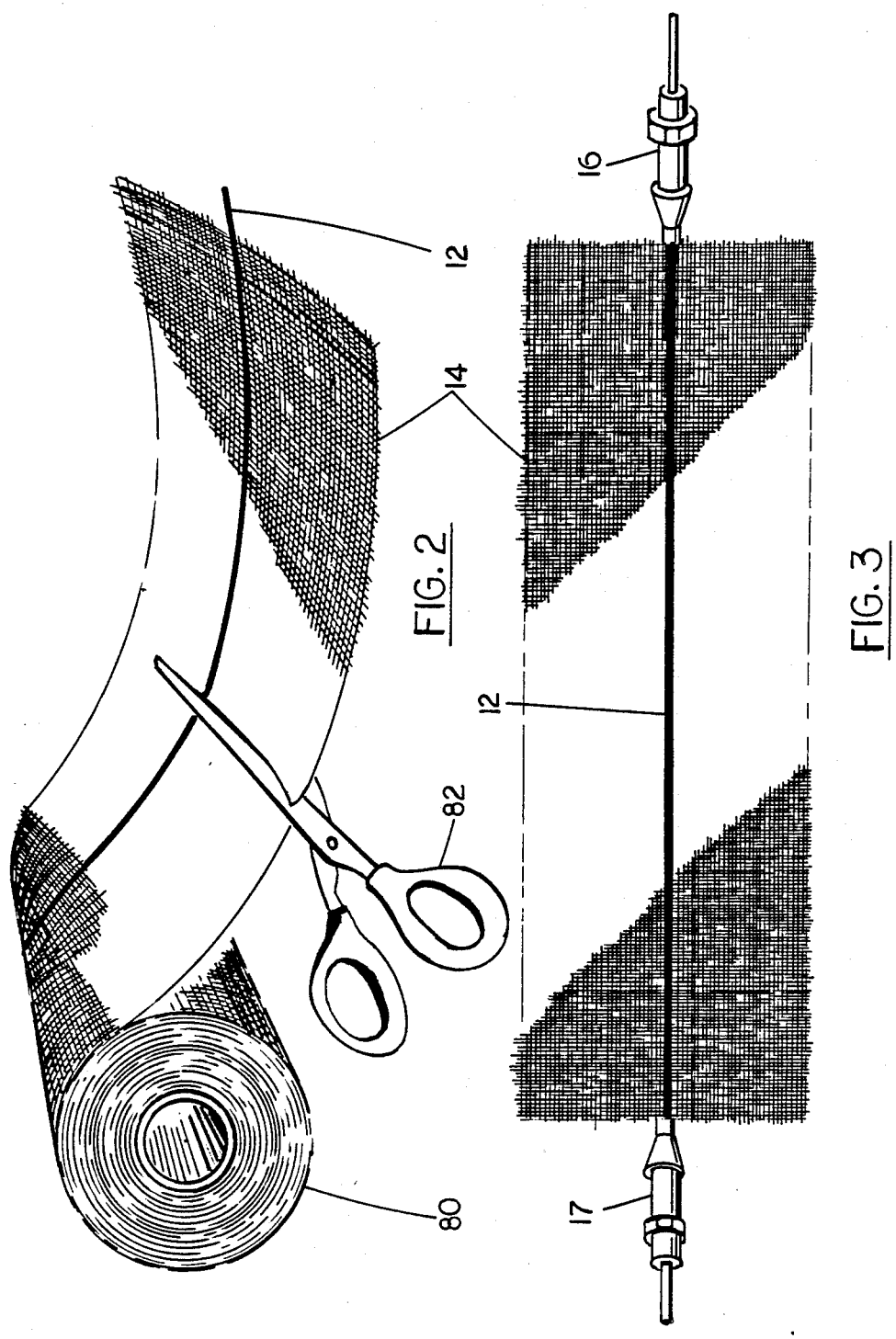

OPTICAL FIBER MOUNTING AND STRUCTURAL MONITORING

The invention relates to mounting optical fibers to structures and monitoring those structures using the optical fibers. A mounting device is provided which includes an optical fiber connected to a support sheet. The device is mounted to a structure and the structure is monitored by monitoring changes in light as it passes through the optical fiber in the mounted device.

It is an object of the invention to provide a readily mountable optical fiber.

It is an object of the invention to provide a readily mountable system for monitoring structures.

It is an object of the invention to provide a method of installation of an optical fiber into and/or onto a structure.

In a preferred embodiment of the invention an optical fiber is attached to a fabric which is readily adapted to be affixed on or into a structure. The optical fiber device is adapted to be used in a monitoring system which incorporates one or more optical fibers. The optical fiber may be embedded in the weave of a fabric of structural fibers to form the mounting device which may be used in fabricating composite structures.

In another preferred embodiment, the optical fiber device is directly incorporated into the weave of composite fabric (i.e, as a weft or warp thread). In another embodiment of the invention, the optical fiber is laminated between two fabric sheets. The optical fiber-containing fabric can be used during the fabrication of composite structures so as to provide a finished structure having sensing optical fibers affixed to or embedded therein. Such structures as aircraft wings and rocket casings are readily improved by optical temperature, pressure, strain and/or stress sensing by connecting an optical fiber thereto in accordance with the invention.

Brennan, in U.S. patent application Ser. No. 154,767 filed Feb. 11, 1988 (the disclosure of which is incorporated herein by reference in its entirety) discloses optical fibers attached to and embedded in structures, such as aircraft. Griffiths in U.S. Pat. No. 4,654,520 discloses the use of optical fibers to monitor structures and is incorporated herein by reference in its entirety.

Lott, et al. in U.S. Pat. No. 2,787,570 and Dildilian in U.S. Pat. No. 2,523,865 both disclose fabric having structural glass thread reinforcements. Lott et al. present a reinforcement sheet in which glass fibers are interwoven with a base fabric or laid against and bonded to the base fabric. Dildilian discloses a woven carpet joining tape in which fiber glass weft threads provide increased strength. In Lott et al. and Dildilian, the glass fibers are not used to effect light transmission. Courtney-Pratt in U.S. Pat. No. 3,321,658 discloses a light guide plate. This light guide does not function as a sensor, and, the face plate product is not used in fabricating a composite structure.

Taylor in U.S. Pat. No. 4,630,887; Conrad et al. in U.S. Pat. No. 4,355,865; Bridge in U.S. Pat. No. 4,307,386; Stiles in U.S. Pat. No. 4,239,335; Olszewski et al. in U.S. Pat. No. 4,138,193; and Carter in U.S. Pat. No. 3,599,679 each disclose optical fiber cable structures.

The prior art does not show a sensing optical fiber woven into or laminated between composite structural fiber matrixes to provide a device which may be attached and/or embedded in composite structures during fabrication, and then used to monitor the temperature, pressure, stress and/or strain in the structure as is provided in accordance with the present invention.

BRIEF DESCRIPTION OF THE INVENTION

An optical fiber mounting device and method of installation and monitoring of a structure using the device. The device includes an optical fiber connected to a support sheet. The support sheet is readily adapted to be connected to a structure. The method of installation of the device includes affixing the support sheet to a structure. The fabricated structure is monitored by propagating light through the installed optical fiber and continuously monitoring the light to detect changes in temperature, pressure, stress and/or strain in the structure.

BRIEF DESCRIPTION OF THE DRAWINGS

FIG. 2 shows a perspective view of a sheet supported optical fiber in accordance with the invention.

FIG. 3 shows a top view of a sheet supported optical fiber with connectors in accordance with the invention.

DETAILED DESCRIPTION OF THE INVENTION

Figure 1:
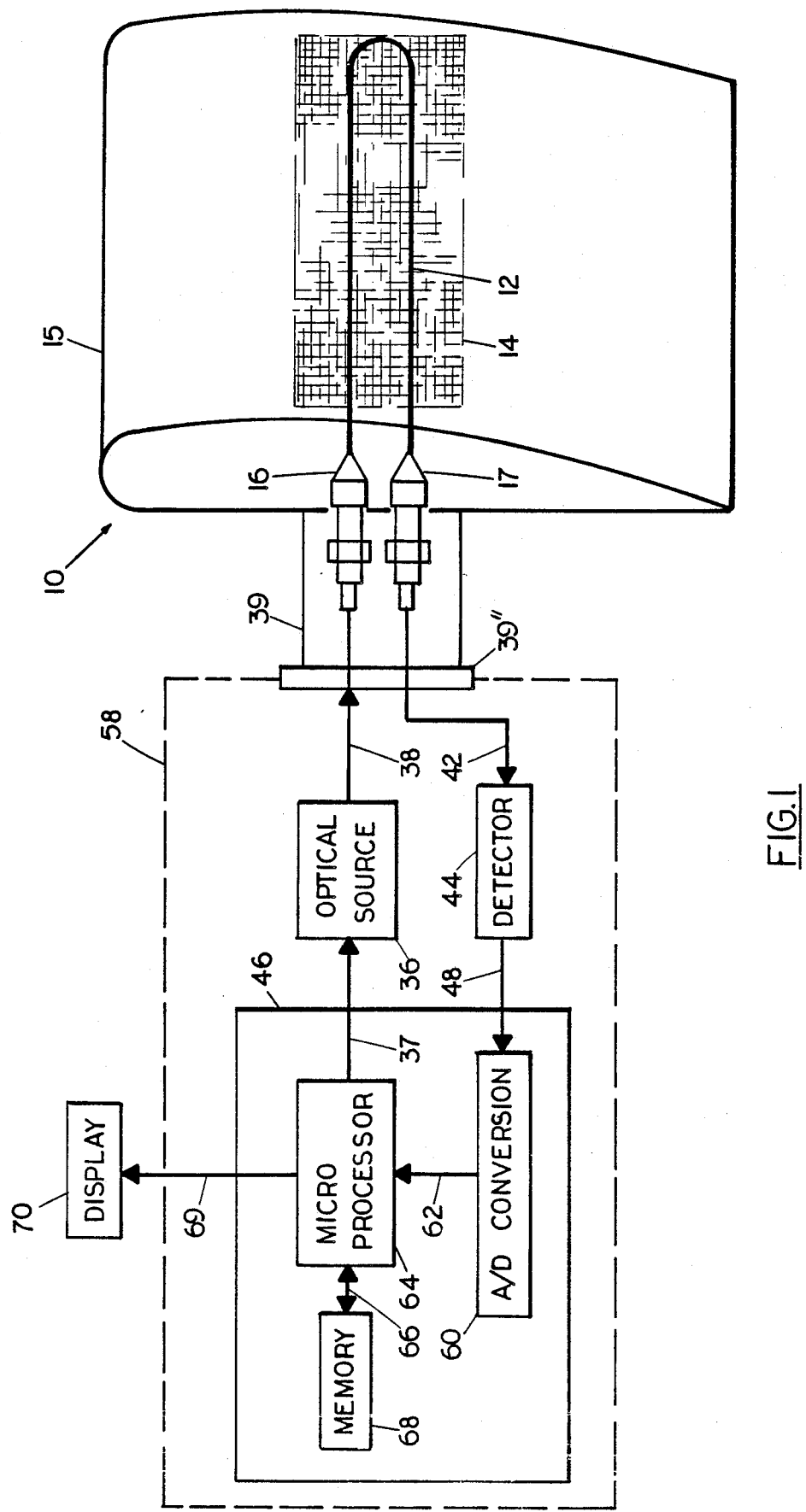
FIG. 1 shows a schematic representation of an optical fiber monitoring system in accordance with the invention.

The invention is now described with reference to FIGS. 1-3. With more particular reference to FIG. 1, an optical monitoring system 10 is shown for use in accordance with the invention. The optical monitoring system 10 is electrically passive and includes an optical fiber 12 which is supported by sheet 14 which is connected to wing 15. Optical fiber 12 is connected to connectors 16 and 17.

The optical fiber mounting system and the method of installation thereof provided in accordance with the invention are useful for monitoring structures, such as wing 15, for stress, strain, etc. The supporting sheet 14 is preferably a structural fiber fabric in which the structural fiber are preferably graphite or glass. As shown in FIG. 2, the optical fiber 12 and sheet 14 are readily stored in a roll, which is easily unwound and cut to the length desired to be affixed to the structure. As shown in FIG. 3 connectors 16 and 17 are affixed to the ends of the cut length of optical fiber 12 and sheet 14 for connection to light source and detection system. The sheet 14 is preferably combined with resin and/or adhesive to adhere to or form part of the structure.

Optical fibers useful in accordance with the invention are characterized by attenuation or loss of light intensity of less than 100 dB per kilometer of optical fiber length as the light is propagated therethrough. Preferred optical fibers include a cladding and a core having different indexes of refraction. Preferred optical fibers include a glass or plastic core. Optical fibers are adapted to guide coherent light without significant changes in the properties of the light due to the optical fiber in the absence of variations in its surroundings such as changes in temperature, pressure stress, strain, etc.

Structural fibers useful in accordance with the invention add substantial strength to composite structures. Such structural fibers may, for example, include structural glass fibers which are characterized by attenuation or loss of light intensity by 50 percent in 3 cm (or greater than 150 dB per Kilometer) of structural glass fiber length for light propagated therethrough. Structural glass fibers are not composed of cores clad with transparent material.

With more particular reference to FIG. 2, the optical fiber 12 and the sheet 14 connected thereto are shown being unrolled from roll 80, and then cut to the desired length using scissors 82. As shown in FIG. 3, connectors 16 and 17 are then attached to the optical fiber 12. The optical fiber 12 is then fabricated into a structure, such as wing 15 as shown in FIG. 1.

As shown in FIG. 1, the optical source 36 transmits electromagnetic radiation, such as light through optical fiber 38 to fiber connector 16. Connector 16 connects fibers 12 and 38. The fibers 12, 38 and 42 may be a single mode or multimode. The optical fibers 38 and 42 extend through connector 39'' and are protected by shielding 39. The optical fiber 42 channels light to optical detector 44. Optical detector 44 is connected to signal conditioning electronics 46 by electrical conductor 48. Signal conditioning electronics 46 is connected by electrical conductor 37 to optical source 36. Optical signal conditioner 58 includes source 36, detector 44 and signal conditioning electronics 46. Signal conditioning electronics 46 includes analog to digital (A/D) converter 60 which is connected by electrical conductor 48 to detector 44, and by electrical conductor 62 to microprocessor 64. Microprocessor 64 sends signals to and receives signals from memory 68 through electrical conductor 66, and is connected to display 70 by electrical conductor 69. The detector 44 is a means for detecting and indicating changes in the light signal provided by the optical source 36. The detector 44 detects the electromagnetic radiation propagating through optical fibers 12 and 42. The signal from detector 44 is converted to digital form in A/D converter 60 and fed into the microprocessor 64. Signals from the microprocessor 64 are displayed by display 70. Any type of physical movement of the optical fiber, such as slight bending, will have an effect upon at least one property of light propagated through the fiber. Changes in properties of the light result from the physical movement of the structure which moves the optical fiber 12.

Figure 1A:
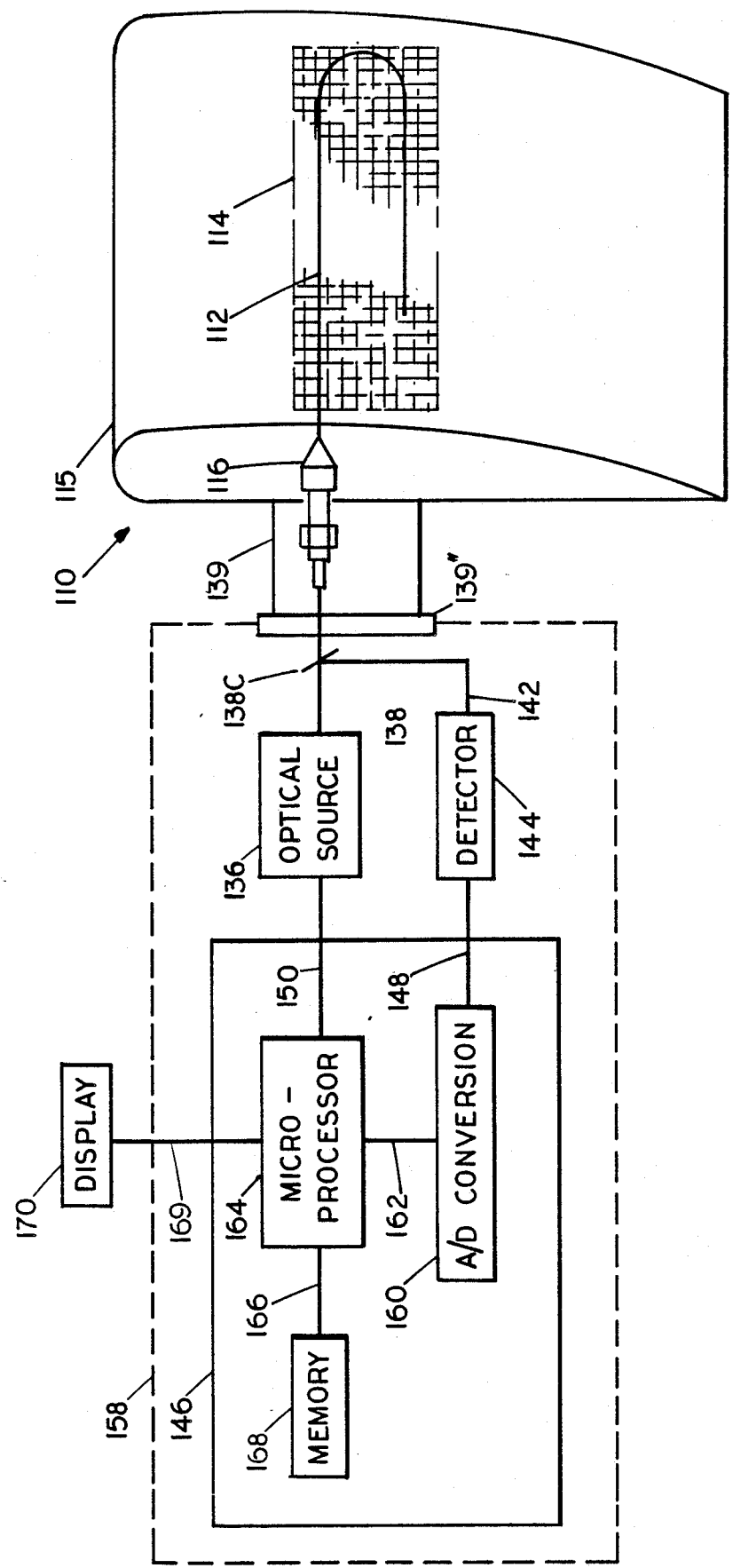
FIG. 1A shows a schematic representation of an optical fiber monitoring system adapted for optical time domain reflectometry in accordance with the invention.

With more particular reference to FIG. 1A, an optical time domain reflectometry monitoring system 110 is shown. System 110 is useful for detecting the magnitude and/or location of stress and/or strain in a structure, such as wing 115, in accordance with the invention is shown. The electrically passive optical monitoring system 110 includes an optical fiber 112 which is supported by sheet 114 which is connected to wing 115.

The optical source 136 transmits electromagnetic radiation, such as light through optical fiber 138 to fiber connector 116. Connector 116 connects fibers 112 and 138. The fibers 138 and 112 may be a single mode or multimode. The optical fiber 138 extends through connector 139'' and is protected by shielding 139. The optical fiber 142 channels the light from coupler 138C to optical detector 144. Optical detector 144 is connected to signal conditioning electronics 146 by electrical conductor 148. Signal conditioning electronics 146 is connected by electrical conductor 150 to optical source 136. Optical signal conditioner 158 includes source 136, detector 144 and signal conditioning electronics 146. Signal conditioning electronics 146 includes analog to digital (A/D) converter 160 which is connected by electrical conductor 148 to detector 144, and by electrical conductor 162 to microprocessor 164. Microprocessor 164 sends signals to and receives signals from memory 168 through electrical conductor 166, and is connected to display 170 by electrical conductor 169. The detector 144 converts light from fiber 142 into a corresponding electrical signal. Changes in the properties of the light signal as it is propagated through the fiber 112 are caused by stress and strain in the wing 115. The detector 144 detects the light propagating through optical fiber 142. Variations in the intensity of the light reflected from fiber 112 are monitored by monitoring the corresponding electrical signal from detector 144. The location and magnitude of stress and strain are determined in microprocessor 164.

Support sheets may be made of fibers and/or films. The support sheet may include an adhesive coating on at least one side thereof. The support sheet may include a release coating on at least one side thereof. In a preferred embodiment of the invention, the adhesive coating is on the opposite side of the sheet from the release coating. However, a release coated sheet may be positioned over the adhesive coating to prevent adhesion of the adhesive coating to the side of the sheet without an adhesive coating while the sheet is stored in a roll and during handling prior to installation of the sheet into or on the structure. A fibrous support sheet is preferably woven.

Structures monitored in accordance with the present invention may be made of metal sheeting, polymeric, (organic or inorganic) composite or other suitable material. Preferred organic polymeric materials include thermoplastic and thermoset polymers. These materials may include a matrix of metal, for example aluminum, thermoplastic such as polyetherether ketone (PEEK), thermoset polymer or ceramic. A preferred composite structure includes high strength filaments or fibers in a polymeric matrix such as a crosslinked epoxy or maleinide.

The support sheet and optical fiber supported thereby are preferably incorporated into composite structures during fabrication. Composite structures are fabricated by forming a mixture of structural fibers and resin (prepreg).

In a preferred embodiment of the invention, the resin are preferably adapted to form a thermoplastic or a thermoset polymer which encloses the structural fibers and supports the sheet which supports the optical fiber. The polymer and structural fibers form the shape of a desired structure such as a wing or a missile casing.

Epoxy resins are well established for use in making high performance composite structures which include high strength fiber. Preferred fiber materials are metal, glass, boron, carbon, graphite, (continuous or chopped filaments) or the like, such as disclosed by Chu et al in the U.S. Pat. No. 4,677,305. Structures made of these composites can weigh considerably less than their metal counterparts of equivalent strength and stiffness.

The structures may be fabricated as taught by Gill et al (assigned to Hercules Incorporated) in U.S. Pat. No. 4,581,086. Helical applicators may be used to deposit a ply or plies of continuous structural filaments into the form of the structure as taught by Gill et al in U.S. Pat. No. 4,519,869 (Assignee, Hercules Incorporated). Alternatively, multiphase epoxy thermosets having rubber within a disperse phase may be used to make structures, as taught by Bard (assigned to Hercules Incorporated) in U.S. Pat. No. 4,680,076. Optical fibers attached to the structural fabric may be embedded in or attached to these structures during fabrication. Attachment to the structures of the optical fibers after construction may be carried out using the same or a different matrix material than is used to fabricate the underlying structures.

Other matrix compositions which may be used to make structures in accordance with the present invention include poly(arylacetylene) as disclosed by Jabloner in U.S. Pat. Nos. 4,070,333; and 4,097,460; and French in U.S. Pat. No. 4,144,218 (each assigned to Hercules Incorporated). Chu, et al. in U.S. Pat. No. 4,656,208, (assigned to Hercules Incorporated), discloses thermosetting epoxy resin compositions and thermosets therefrom.

In a preferred embodiment of the invention, the change in the intensity of the light transmitted through fiber 38 is monitored by signal conditioning electronics 46. In another preferred embodiment of the invention, the change in the polarization state of the transmitted light is monitored by signal conditioning electronics 46. Alternatively, a interferometrics may be used to monitor the transmitted light.

Various further applications and modifications falling within the scope and spirit of this invention will occur to those skilled in the art. The method and device accordingly are not to be thought of as limited to the specific embodiment set forth merely for illustrative purposes. It is to be understood that this invention is not limited to the disclosed embodiment, but, on the contrary, is intended to cover various modifications and equivalent arrangements included within the spirit and scope of the appended claims.

What is claimed is:

1. An optical fiber mounting device, consisting essentially of:
   an optical fiber and
   a support sheet of fabric,
   said optical fiber being connected to said sheet of fabric,
   said sheet having a release coating on at least one side of said fabric.

2. The device of claim 1 wherein said optical fiber is characterized by attenuation of light intensity by less than 100 dB per kilometer of length of said optical fiber as said light is propagated through said optical fiber.

3. The device of claim 1 wherein said support sheet comprises graphite fiber.

4. The device of claim 1 wherein said support sheet and said optical fiber are wound into a roll, and said support sheet comprises structural fibers.

5. The fiber of claim 1 in combination with an optical source, an optical detector, a microprocessor, a memory, electrical conductors and a display, said optical source being adapted to transmit light into said optical fiber, said optical detector being adapted to detect light emanating from said optical fiber, said microprocessor being connected by said electrical conductors to said optical source, said optical detector, said memory and said display.

6. The device of claim 1 further comprising a structure, said sheet being connected to said structure.

7. The device of claim 6 wherein said structure is an aircraft.

8. The device of claim 1 wherein said sheet comprises woven structural fiber.

9. The device of claim 1 wherein said sheet comprises an adhesive coating on at least one side of said sheet.

10. The device of claim 1 in combination with an optical connector.

11. The device of claim 11 in combination with an optical source and an optical detector.

12. A method of connecting an optical fiber to a structure, comprising:
    providing an optical fiber connected to a substantially nonmetal support sheet,
    said sheet having a release coating on at least one side of said sheet,
    providing a structure, and
    connecting said sheet to said structure whereby said optical fiber is installed.

13. The method of claim 12 wherein said optical fiber is characterized by attenuation of light intensity by less than 100 dB per kilometer of length of said optical fiber as said light is propagated through said optical fiber.

14. The method of claim 12 wherein said sheet comprises graphite fiber, and said fiber and said sheet are wound into a roll and then unwound from a said roll and cut before being affixed to said structure.

15. The method of claim 12 wherein said structure is an aircraft or an airfoil.

16. The method of claim 14 wherein said structure is an aircraft and said sheet is affixed to said aircraft by resin.

17. The method of claim 12 further comprising providing an optical source, an optical detector, a microprocessor, a memory, electrical conductors and a display, said optical source being adapted to transmit light into said optical fiber, said optical detector being adapted to detect light emanating from said optical fiber, said microprocessor being connected by said electrical conductors to said optical source, said optical detector, said memory and said display.

18. The method of claim 17 further comprising emitting light from said optical source into said optical fiber and monitoring said light emanating from said optical fiber to detect the magnitude and location of stress and/or strain in said structure.

19. The method of claim 18 wherein said structure comprises graphite fiber.

20. The method of claim 18 wherein said structure comprises a thermoset polymer passing light into said optical fiber.

21. The method of claim 18 further comprising passing light into said optical fiber monitoring the magnitude and location of movement in said structure by detecting changes in characteristics of said light.

* * * * *